(12) United States Patent
Mueller

(10) Patent No.: US 10,306,840 B1
(45) Date of Patent: Jun. 4, 2019

(54) REINFORCED AGRICULTURAL SILAGE COVERS

(71) Applicant: Adam J. Mueller, Montfort, WI (US)

(72) Inventor: Adam J. Mueller, Montfort, WI (US)

( * ) Notice: Subject to any disclaimer, the term of this patent is extended or adjusted under 35 U.S.C. 154(b) by 0 days.

(21) Appl. No.: 16/053,224

(22) Filed: Aug. 2, 2018

Related U.S. Application Data

(60) Provisional application No. 62/619,446, filed on Jan. 19, 2018.

(51) Int. Cl.
*A01F 25/13* (2006.01)

(52) U.S. Cl.
CPC .................... *A01F 25/13* (2013.01)

(58) Field of Classification Search
CPC ...................................... A01F 25/13
See application file for complete search history.

(56) References Cited

U.S. PATENT DOCUMENTS

| | | | | |
|---|---|---|---|---|
| 1,860,244 A * | 5/1932 | Grant | ............ | B65D 31/04 383/107 |
| 3,063,889 A * | 11/1962 | Staff | ............ | B29C 66/435 156/201 |
| 3,982,481 A * | 9/1976 | Console | ............ | A23B 7/06 99/477 |
| 4,048,678 A * | 9/1977 | Chillino | ............ | E04H 4/105 4/499 |
| 4,090,008 A * | 5/1978 | Haley | ............ | B29C 71/02 428/192 |
| 4,365,029 A | 12/1982 | Reizer et al. | | |
| 4,428,720 A * | 1/1984 | Van Erden | ............ | B26D 1/035 425/296 |
| 4,999,212 A * | 3/1991 | Ludwig | ............ | B05C 1/003 118/410 |
| 5,067,182 A * | 11/1991 | Koelsch | ............ | E04H 4/08 4/498 |

(Continued)

FOREIGN PATENT DOCUMENTS

| | | | | |
|---|---|---|---|---|
| CA | 2780189 A1 * | 5/2011 | ............ | A01F 25/13 |
| CN | 107400894 A * | 11/2017 | | |
| JP | 72008144 B * | 8/1968 | | |
| KR | 1579247 B1 * | 12/2015 | | |

OTHER PUBLICATIONS

"Agricultural repair tape," www.farmbagsupply.com/agriculturalrepairtape.htm.

(Continued)

*Primary Examiner* — Jeanette E Chapman
(74) *Attorney, Agent, or Firm* — Charles S. Sara; Erin Ella Block; DeWitt LLP

(57) ABSTRACT

Agricultural silage covers and bale wraps are repaired and reinforced against the elements by an elastomeric coating applied directly to the silage cover after it has been filled with silage feed. The process involves applying a protective coating, typically an elastomeric acrylic coating, to the entire outer layer of the silage cover by spray coating after the coating material has been prepared. The final product is a silage cover with a permanent reinforced overall coating to assist in preventing additional tears and openings in the fabric of the silage cover and sealing holes and damage to the silage cover in an air-tight and moisture-proof manner, thereby protecting the silage feed.

11 Claims, 2 Drawing Sheets

(56) References Cited

U.S. PATENT DOCUMENTS

| | | | | |
|---|---|---|---|---|
| 5,543,008 | A * | 8/1996 | Hidber | B29C 51/085 |
| | | | | 156/229 |
| 6,014,778 | A * | 1/2000 | Varnado | E04H 4/101 |
| | | | | 242/919 |
| 6,276,381 | B1 * | 8/2001 | O'Brien | B60J 11/02 |
| | | | | 135/115 |
| 6,855,415 | B2 * | 2/2005 | Lilly | B05D 1/42 |
| | | | | 427/487 |
| 7,288,290 | B2 * | 10/2007 | Chao | B05D 7/542 |
| | | | | 427/372.2 |
| 7,722,921 | B2 * | 5/2010 | Shimoda | G02B 1/111 |
| | | | | 427/162 |
| 9,340,457 | B2 * | 5/2016 | Qi | C04B 26/08 |
| 2006/0010783 | A1 * | 1/2006 | Evans | A01F 25/13 |
| | | | | 52/3 |
| 2006/0121292 | A1 * | 6/2006 | Weaver | C23C 4/02 |
| | | | | 428/457 |
| 2010/0247789 | A1 * | 9/2010 | Snow | C09D 127/12 |
| | | | | 427/393.5 |

OTHER PUBLICATIONS

"Bale wrap," https://frankwinne.com/agricultural-products/bale-wrap/.
"Silage repair tape," tytanintl.info/?product+silage-repair-tape.
Wacek-Driver, C., "Silage bags remain popular as a storage option," Hay & Forage Grower, Mar. 2016, pp. 6-7.

* cited by examiner

REINFORCED AGRICULTURAL SILAGE COVERS

CROSS-REFERENCE TO RELATED APPLICATION

The present application claims priority to U.S. Provisional Application entitled "Reinforced Agricultural Silage Bags," Ser. No. 62/619,446, filed Jan. 19, 2018, which is incorporated herein by reference in its entirety.

FIELD OF THE INVENTION

The present invention is directed to a process for reinforcing silage covers and a process for repairing silage covers. The present invention is further directed to reinforced silage covers.

BACKGROUND

Silage is fermented, high-moisture stored fodder which can be fed to farm animals, such as cattle, sheep and other ruminants. It is usually made from grass crops, including maize, sorghum or other cereals, using the entire green plant (not just the grain). Silage can also be made from many field crops, such as oats, hay or alfalfa. The fermentation typically, takes place in standard silos known to the art. Alternatively, the crops can be placed on the ground, rolled by tractors to push out air, and then wrapped in plastic cover sheets. The crops can also be placed into large plastic agricultural silage bags which are laid on the ground, wrapped with bale covering, or placed in bale tubes. The purpose of placing the crops in silos or silage covers is to minimize oxygen content to prevent spoilage. When filled and sealed, the contents are allowed to ferment thereby creating silage.

Silage bags are typically made of plastic with an oxygen barrier film and have a thickness between approximately 2-9 or more millimeters, typically between 6-9 millimeters. The size of the bags can range from 7.3-36.6 meters (24-120 feet) wide with lengths up to 30.48-152.4 meters (100-500 feet) or more. Silage bags usually come in sizes of 8, 9, 10, 12, and 14 feet diameter.

Silage bags are typically made from a high-density polyethylene (HDPE). Silage covers are filled by a machine called a bagger. The silage cover typically comes from the factory in a box and is set up on the bagger so that as it is filling, folds are pulled off of the folded bag on the bagger. The end of the bag is tied before the filling process starts. The bagger either has a cable tension system, or pressure brakes to allow the forage or grain to be packed into the bag. When the bag is full, the other end of the bag is pulled off the bagger and rolled up. The rolled edge is then covered with dirt or gravel to make an airtight seal.

Bale wrap and bales tubes are also made from HDPE. Round bales and square bales can be wrapped individually or in a line to either protect dry hay from the elements, or to create high moisture hay, called baleage bales. A bale tube operates similar to the bagger system discussed above. High moisture bales are slid into an open tube that will shrink down tight onto the bales. For ease of reference, the term "silage cover" is used throughout the application to refer to silage bags, bale covers and all of the above-mentioned coverings for silage and other similar means for covering silage, grains, and other agricultural forage.

Once the forage is in the silage cover and sealed, the fermentation process can begin. Of note, grain that is not being used as high moisture feed, such as corn, must be dried down to 14% moisture to prevent fermentation.

Silage covers are durable, but do not stand up to certain damage. For example, pests can chew through covers, crawl on covers and punch holes with their claws. Birds can peck through covers. Hail can penetrate covers, as can debris from wind storms and tornados. Covers near power lines or trees are prone to ice falling on them during freezing rain events. If the covers are opened with holes allowing air to infiltrate the cover, the entire contents in the cover can mold and become unusable.

The typical manner of dealing with a damaged silage cover is to replace the cover with a new one, which is die intensive, costly, and exposes the contents to more oxygen. Due to the expense of replacing, sometimes damaged covers are left unrepaired and some or all of the silage is lost. Another method of repair includes the use of conventional tapes, which is time consuming, does not necessarily adhere in an air-tight or moisture-proof way, and can come loose thereby allowing air and moisture in again and the silage to spoil.

Therefore, there exists a need for an improved system for repairing and/or reinforcing silage covers.

SUMMARY OF THE INVENTION

The present invention overcomes the issues above by providing for a system of protecting silage covers by applying an elastomer coating to the silage cover in order to add thickness and strength to the agricultural silage cover. The present invention also provides for a system of repairing agricultural silage covers by applying to the damaged portions of the agricultural silage cover an elastomer coating to seal and close holes once the cover has been damaged.

The present invention is directed to a reinforced silage cover, comprising a silage cover of a volume to hold silage, wherein the silage cover comprises plastic and wherein an outer surface of the silage cover has been provided with a protective air-tight, moisture-proof coating in sufficient quantity to reinforce the silage cover and inhibit damage to the integrity of the cover.

The present invention is further directed to a method of reinforcing a silage cover to strengthen the cover and inhibit unwanted damage to the integrity of the cover, comprising heating a protective air-tight, moisture-proof coating material to pliant temperature, and applying the protective air-tight, moisture-proof coating to the silage cover in sufficient quantity to reinforce the silage cover and inhibit unwanted damage to the integrity of the cover.

The present invention is additionally directed to a method of repairing a filled silage cover to seal holes created therein and inhibit additional damage to the silage, comprising preparing the silage cover by removing any loose debris and dirt therefrom, ensuring the silage cover is dry, heating a protective air-tight, moisture-proof coating material to pliant temperature, and applying the protective air-tight, moisture-proof coating to the damaged areas in sufficient quantity to seal the holes and reinforce the silage cover.

There are many advantages to these methods. The covers are much more durable once they are coated and should provide protection against small diameter hail and the like. The process of coating the covers is at least three times faster than re-bagging and half the cost to the farmer. The coating sets up instantly, allowing the application process to go until rain starts to fall and the covers can still be cut and opened with a knife. If the coating is being applied due to damage to the silage cover, the coating will seal up the damaged areas while not leaking into and contaminating the feed. In addition to being more cost effective than re-bagging, the silage will also not be further exposed to oxygen. Finally, most farmers' insurance policies cover 100% of the coating.

The objects and advantages of the invention will appear more fully from the following detailed description of the preferred embodiment of the invention made in conjunction with the accompanying photographs.

DETAILED DESCRIPTION OF THE INVENTION

Figure 1:
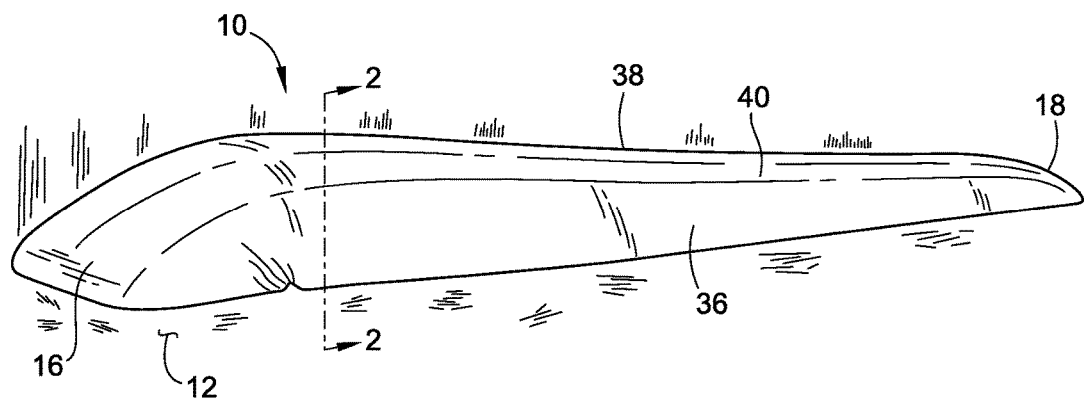
FIG. 1 is a perspective view of a reinforced silage covering.
Figure 4:
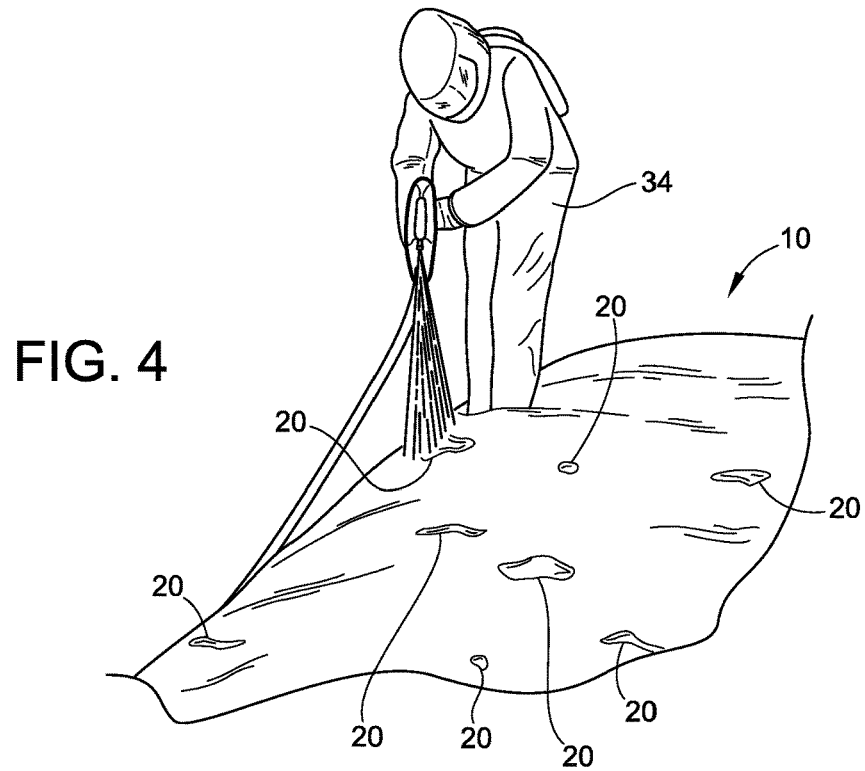
FIG. 4 is a perspective view of a damaged silage cover being repaired with the protective coating.

Referring to FIG. 1, the present invention is directed to a reinforced silage cover 10, which is designed to inhibit damage to the integrity of the cover 10. As illustrated in FIG. 1, the silage cover 10 is an elongated tubular construction designed to rest on the ground 12. After the silage cover 10 is filled with silage 14, illustrated in FIG. 2, the silage cover is sealed at each end 16, 18 as described previously. The present invention is also directed to a method of reinforcing a silage cover 10 and a method of repairing the silage cover 10 to seal holes and damage 20 to the silage cover 10, as illustrated in FIG. 4, and inhibit additional damage to the silage 14. It should be noted that the silage cover 10 illustrated in the figures is merely one embodiment of a silage cover and the present invention is suitable for all types of silage covers.

Figure 2:
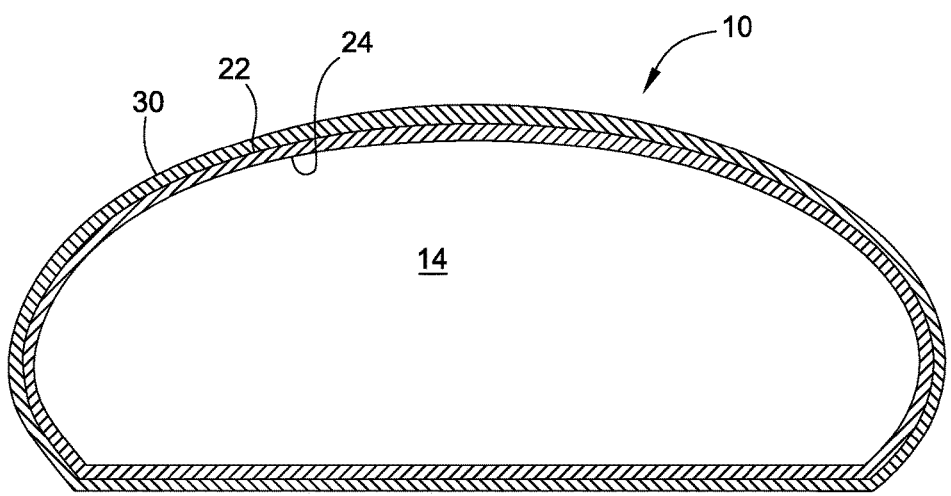
FIG. 2 is a cross-sectional view of the reinforced silage covering of FIG. 1, taken along lines 2-2 of FIG. 1.

FIG. 2 is a cross-sectional view of the reinforced silage cover 10 illustrating the outer surface 22 of the silage cover 10 and the inner surface 24, which is adjacent the mass of silage 14. The silage cover 10 is sealed with a protective air-tight, moisture-proof protective coating 30 applied to the outer surface 22 of the silage cover 10. The protective coating 30 is preferably a 100% solids elastomeric coating or a solvent based elastomeric coating and can be an acrylic coating, a silicone coating, a urethane coating and/or a polyurea coating. Preferably, the protective coating 30 is a coating that sets up instantly allowing virtually no dry time. In a preferred embodiment, the protective coating 30 is a polyurethane-urea hybrid based solvent free membrane coating (herein after "polyurea blend coating"). It should be understood that this is merely one embodiment of the invention and other coatings as described above can also be used.

One method of preparing the protective coating 30 is to mix the coating on-site prior to application (not shown). In one embodiment, a polyurea blend coating is the protective coating 30 and is mixed on-site for application. In this embodiment, an acceptable isocyanate mixture and an acceptable polyol/polyamine mixture are combined together in equal parts to form the protective coating 30. One example of an acceptable isocyanate mixture is methylene diphenyl diisocyanate An example of an acceptable polyol/polyamine mixture is glycerol tris(poly(propylene glycol)) amine terminated)ether between approximately 60-99.9% and diethyl toluene diamine between approximately 7-13%. The isocyanate mixture is heated to at least 70° F. before combining and the polyol/polyamine mixture is agitated before combining. Preferably, the polyol/polyamine mixture is periodically agitated throughout combining and application. Immediately before combining, the isocyanate mixture and the polyol/polyamine mixture are both heated to 160° F. Once heated, the mixtures are combined and applied to the silage cover 10. Any effective method of combining the mixtures to prepare the protective coating 30 can be used. One such method is to use a plural component reactor, such as the GRACO® E-30 Plural Component Reactor (Graco, Inc., Minneapolis, Minn.), to heat the mixtures separately and deliver them to a spray nozzle, such as the GRACO® Fusion Air Purge spray gun. The spray nozzle combines the mixtures in equal parts to prepare the protective coating 30. The isocyanate mixture and the polyol mixture may be contained separately in 55-gallon drums prior to combining for ease of transportation and supplying to the plural component reactor. In this embodiment, band heaters, such as the BriskHeat® Heavy-Duty Silicone Rubber Drum/Pail Heater (BriskHeat Corporation, Columbus, Ohio) for a 55-gallon drum, can be used on the drums to heat the chemicals to the desired temperature before combining. It should be understood that this method is merely one embodiment of preparing a polyurea blend coating on-site to be used as the protective coating 30 in the present invention. Other methods may be used for mixing the protective coating 30 and other coatings may require different methods of mixing.

Once the protective coating 30 is mixed, it is ready to be applied to the silage cover 10. One method for applying the protective coating 30 to the silage cover 10 is to spray it onto the outer surface 22 of the silage cover 10. Preferably, the equipment to apply the protective coating 30 is completely mobile and does not need an independent power source. In one embodiment, the application equipment for applying the above-described polyurea blend coating as the protective coating 30 consists of a coating preparation system for preparing the protective coating 30, an air-compressor system, a spraying system, and a hose system. One example of a coating preparation system is the GRACO® E-30 Plural Component Reactor (Graco, Inc., Minneapolis, Minn.), as stated above. A representative spray system is a GRACO® Fusion Air Purge spray gun and IPM® Air Driven Piston Pumps (International Pump Manufacturing, Inc., Sumner, Wash.) to get the material out of the 55-gallon drums to the plural component reactor. A representative air-compressor system is the CASTAIR Industrial Series Air Compressor, Model I10312HC2-S(Castair, Inc., Spicer, Minn.) for the air-compressor and the BelAire High Inlet Temp Dryer, Model CPXHT50 (BelAire Compressor, Rock Hill, S.C.) for the air dryer. In one embodiment, the hose system includes two 200-foot GRACO® Water Jacketed Heated Hoses and an airline (not pictured). It should be understood that the hose system can be made up of any components so long as the hoses are able keep the mixtures separated and heated to 160° F. The application equipment can be powered by a stand-alone generator, such as a JOHN DEERE® 40 KW diesel generator (Deere & Company, Moline, Ill.). It should be understood that these are merely embodiments of how the protective coating 30 can be prepared and applied to the silage cover 10. These embodiments should not be interpreted at limiting the method of reinforcement or repair.

Figure 3:
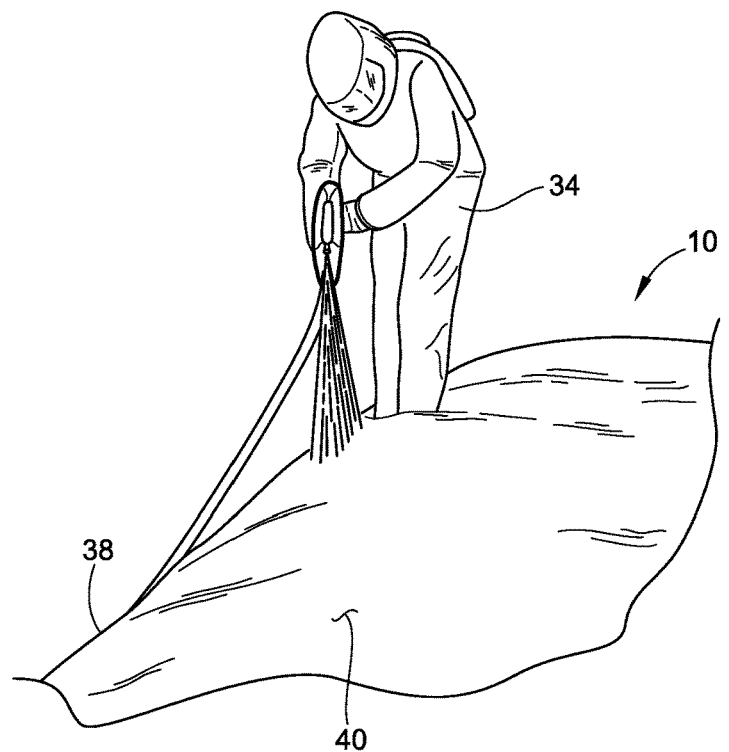
FIG. 3 is a perspective view of a silage cover being coated with the protective coating.

FIG. 3 is a side perspective view of a silage cover 10 being coated with the protective coating 30. FIG. 3 illustrates a method of reinforcing a silage cover 10. In one embodiment, the protective coating 30 is prepared for application as detailed above by a technician 34 on-site. Once prepared, the protective coating 30 is applied to the outer surface 22 of the silage cover 10 by the technician 34. In one embodiment, the protective coating 30 is sprayed onto the silage cover 10 by the technician 34 using the spraying system detailed above. The protective coating 30 preferably creates an air-tight, moisture-proof seamless barrier on the silage cover 10 to reinforce the silage cover 10 against weather damage and animal damage.

FIG. 4 is a side perspective view of a damaged silage cover 10 being repaired with the protective coating 30. FIG. 4 illustrates a method of repairing a silage cover 10 that has been damaged. In this method, the silage cover 10 is dried and any excess dirt or other loose material is removed from the outer surface 22 of the silage cover 10. Large holes and damage 20 in the silage cover 10 can be prepped with tape, i.e., duct tape, prior to applying the protective coating 30. The protective coating 30 is then prepared for application as detailed above by a technician 34 on-site. Once prepared, the protective coating 30 is applied to the outer surface 22 of the silage cover 10 where holes and damage 20 have occurred. Preferably, the protective coating 30 is sprayed onto the silage cover 10 by the technician 34. In one embodiment, the protective coating 30 is applied using the spraying system detailed above. The protective coating 30 preferably creates an air-tight, moisture-proof seamless barrier on the silage cover 10 to reduce or eliminate holes and damage 20 in the silage cover 10.

Referring to both FIGS. 3 and 4, advantageously, the protective coating 30 can be applied to the silage cover 10 relatively simply and in a short period of time. In one embodiment, the technician 34 first prepares the silage cover 10, if necessary, by removing any loose debris on the outer surface 22 of the silage cover 10, drying the outer surface 22 of the silage cover, and prepping holes and damage 20.

Then, the technician 34 starts to prepare the equipment for the application. In one embodiment, utilizing the equipment indicated above, the oil and fuel in the generator and compressor must be checked and corrected if necessary. The generator is then started. After the generator is running, the air dryer and compressor are activated. The mesh screens in the spray guns and on the reactor are cleaned and prepared. The throat seal liquid on the reactor is changed and the hose heaters and reactor heaters are activated. The hose is then unwound to a desired length.

Next, the technician 34 prepares the protective coating 30 for application using the process indicated above.

Then, the technician 34 applies the protective coating 30 to the silage cover 10 using the process indicated above. Preferably, the application process is commenced by applying the protective coating 30 in a manner such that the technician 34 applying it does not need to come into contact with already coated portions of the now reinforced silage cover 10. In this embodiment, the silage cover 10 is reinforced by first applying the protective coating 30 to one side 36 of the silage cover 10, then the top side 40 of the silage cover 10, and then to the other side 38 of the silage cover 10.

In one embodiment, the protective coating 30 is one that dries instantaneously such that the technician 34 can continue application until inclement weather actually occurs (such as rain or snow). The protective coating 30 is applied by the technician 34 to the silage cover 10 until the desired thickness is achieved or until the holes and damage 22 are repaired. Preferably, the protective coating 30 is applied at a thickness of roughly 30-40 millimeters. It should be understood that the amount of protective coating 30 used on the silage cover 10 varies depending on the size of the holes and damage 20, what type of feed is in silage cover 10, what type of silage cover 10 is used, among other potential variations. For example, corn silage packs into silage covers 10 much easier creating a smoother surface versus hay and other forages. The smoother and firmer the silage covers 10 are, the less protective coating 30 it usually takes to adequately reinforce the silage cover 10 or repair the holes and damage 20. In one embodiment, a singular application of the protective coating 30 is needed. However, it is within the scope of the present invention to apply additional applications of the protective coating 30 as may be required.

Finally, the reinforced silage cover 10 is then inspected to confirm that the entire silage cover 10 has been coated and/or all holes and damage 20 are repaired. If not, the process can be repeated until the desired result is achieved.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A method of repairing a filled silage cover, comprising:
   a. removing loose debris from an outer surface of the silage cover,
   b. ensuring the outer surface of the silage cover is dry,
   c. heating a protective air-tight, moisture-proof coating to pliant temperature, and d. applying the protective air-tight, moisture proof coating to a one or more damaged portion of the silage cover in sufficient quantity to seal the one or more damaged portion of the silage cover.

2. The method of claim 1 wherein the coating is sprayed onto the outer surface of the silage cover.

3. The method of claim 1 wherein the protective air-tight, moisture-proof coating is heated to about 160 degrees before applying.

4. The method of claim 1 wherein the protective air-tight, moisture-proof coating is selected from the group consisting of a 100% solids elastomeric coating and a solvent based elastomeric coating.

5. The method of claim 1 wherein the protective air-tight, moisture-proof coating is selected from the group consisting of an acrylic coating, a silicone coating, a urethane coating, and a polyurea coating.

6. The method of claim 1 wherein the protective air-tight, moisture-proof coating is applied at a thickness of between about 30-40 millimeters.

7. The method of claim 1 wherein tape is applied to the outer surface of the silage cover to overlay large openings before the protective air-tight, moisture-proof coating is applied.

8. A method of reinforcing and repairing a silage cover to strengthen the cover and inhibit damage to the integrity of the silage cover, comprising:
   a. filling a silage cover with silage,
   b. removing dirt and debris from an outer surface of the silage cover,
   c. drying the outer surface of the silage cover,
   d. applying tape to overlay large openings in the silage cover,
   e. heating a protective air-tight, moisture-proof coating to pliant temperature, and
   f. spraying the protective air-tight, moisture-proof coating to an outer surface of the silage cover in sufficient quantity to repair and reinforce the silage cover.

9. The method of claim 8 wherein the protective air-tight, moisture-proof coating is heated to about 160 degrees before spraying.

10. The method of claim 9 wherein the protective air-tight, moisture-proof coating is an elastomer and is selected from the group consisting of an acrylic coating, a silicone coating, a urethane coating, and a polyurea coating.

11. The method of claim 9 wherein the protective air-tight, moisture-proof coating is applied at a thickness of between about 30-40 millimeters.

* * * * *